(12) United States Patent
Robshaw et al.

(10) Patent No.: US 9,332,430 B2
(45) Date of Patent: May 3, 2016

(54) METHOD OF IDENTIFYING AND AUTHENTICATING A RADIO TAG BY A READER

(75) Inventors: Matthew Robshaw, Herblay (FR); Henri Gilbert, Bures sur Yvette (FR)

(73) Assignee: FRANCE TELECOM, Paris (FR)

( * ) Notice: Subject to any disclaimer, the term of this patent is extended or adjusted under 35 U.S.C. 154(b) by 266 days.

(21) Appl. No.: 13/576,586

(22) PCT Filed: Jan. 26, 2011

(86) PCT No.: PCT/FR2011/050146
§ 371 (c)(1),
(2), (4) Date: Nov. 7, 2012

(87) PCT Pub. No.: WO2011/092426
PCT Pub. Date: Aug. 4, 2011

(65) Prior Publication Data
US 2013/0043982 A1    Feb. 21, 2013

(30) Foreign Application Priority Data
Feb. 1, 2010   (FR) ...................................... 10 50694

(51) Int. Cl.
*G06K 7/01* (2006.01)
*G05B 19/00* (2006.01)
*H04W 12/06* (2009.01)

(52) U.S. Cl.
CPC ..................................... *H04W 12/06* (2013.01)

(58) Field of Classification Search
CPC combination set(s) only.
See application file for complete search history.

(56) References Cited

U.S. PATENT DOCUMENTS

| 2007/0096877 | A1* | 5/2007 | Quan et al. | 340/10.2 |
| 2008/0094220 | A1* | 4/2008 | Foley et al. | 340/572.4 |
| 2008/0143485 | A1* | 6/2008 | Frerking | 340/10.1 |
| 2009/0040021 | A1* | 2/2009 | Seo et al. | 340/10.1 |
| 2009/0096584 | A1* | 4/2009 | Gravelle et al. | 340/10.1 |
| 2011/0068894 | A1* | 3/2011 | Braun | 340/5.8 |
| 2013/0043982 | A1* | 2/2013 | Robshaw et al. | 340/10.1 |

FOREIGN PATENT DOCUMENTS

| CN | 103123681 A * | 5/2013 | .............. G06K 7/00 |
| CN | 103123681 A * | 5/2013 | |

OTHER PUBLICATIONS

International Search Report and Written Opinion dated Mar. 24, 2011 for corresponding International Application No. PCT/FR2011/050146, filed Jan. 26, 2011.

(Continued)

*Primary Examiner* — Brian Zimmerman
*Assistant Examiner* — Cal Eustaquio
(74) *Attorney, Agent, or Firm* — David D. Brush; Westman Champlin & Koehler, P.A.

(57) ABSTRACT

A method and apparatus are provided for identifying and authenticating a radio tag by a radio reader. The tag forms part of a set of tags in a radio range of the reader and has selected a time slot from a set of available time slots. The method includes: a step of the reader sending a query message during the selected time slot; and a step of the reader receiving a reply message from the tag that selected the time slot. The reply message includes a random value selected by the tag. The tag stores authentication coupons and the reply from the tag received by the reader during the time slot contains, as a random value selected by the tag, a value that is a function of one of the coupons.

10 Claims, 4 Drawing Sheets

(56) References Cited

OTHER PUBLICATIONS

Paschmann et al., "Lightweight Cryptography and RFID: Tackling the Hidden Overheads", [online] Dec. 2, 2009, p. 17 PP, XP002606214.

Epcglobal Inc. "EPC Radio-Frequency Identity Protocols Class-1 Generation-2 UHF RFID Protocol for Communications at 860 MHz-960 MHz Version 1.2.0", Internet Citation, [online] Oct. 23, 2008, pp. 1-108, XP002606215.

Girault et al., "On the Fly Authentication and Signature Schemes Based on Groups of Unknown Order", Journal of Cryptology, vol. 19, No. 4, Sep. 25, 2006, pp. 463-487, XP019440584.

International Preliminary Report on Patentability and English translation of Written Opinion dated Sep. 11, 2012, for corresponding International Application No. PCT/FR011/050146, filed Jan. 26, 2011.

\* cited by examiner

METHOD OF IDENTIFYING AND AUTHENTICATING A RADIO TAG BY A READER

CROSS-REFERENCE TO RELATED APPLICATIONS

This Application is a Section 371 National Stage Application of International Application No. PCT/FR2011/050146, filed Jan. 26, 2011, which is incorporated by reference in its entirety and published as WO 2011/092426 on Aug. 4, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique of identifying and authenticating a radio tag by a radio reader.

A particularly advantageous application of the disclosure lies in the field of radio identification, known specifically in English as "radio frequency identification" or "RFID".

BACKGROUND OF THE DISCLOSURE

Radio identification is a technique used for storing and recovering data remotely by using markers known as radio tags, or "RFID tags". A radio tag is a small item such as a sticky label that can be stuck on or incorporated in entities or goods. It comprises an antenna associated with an electronic chip that enables it to receive and respond to radio requests transmitted from a transceiver referred to as a "reader". By way of example, radio tags are used for identifying people when the tags are incorporated in passports, in tickets, or in payment cards, or for identifying goods as with a bar code. This application to goods facilitates managing stock and makes it possible to track stock throughout the distribution system for the goods. Nowadays numerous sectors of activity, such as the pharmaceutical industry, distribution, fashion, and book selling make use of RFID systems for tracking articles. RFID technology is being used increasingly to automate manual processes, to authenticate and protect freight, and to provide real time visibility of stocks.

Among existing mechanisms for identifying a radio tag, the electronic product code (EPC) consortium EPCglobal has standardized a tag identification protocol commonly known as the "tag singulation" mechanism [EPCglobal: EPC Radio-frequency identity protocols, class-1 generation-2 UHF RFID, Protocol for communications at 860-960 MHz, Version 1.2.0]. The identification mechanism is adapted to managing collisions at radio level when a plurality of radio tags respond simultaneously to a request from a reader. It thus enables a radio reader to identify, from among a set of tags, each tag in succession in order subsequently to converse with one identified tag at a time in the context of some specific application. By way of example, such an application is an authentication application adapted to verifying that the identified tag is indeed the tag that it holds itself out to be. Thus, associating these identification and authentication mechanisms makes it possible to provide accurate tracking of goods provided with such radio tags, and to combat counterfeiting effectively by acting at each step in a system for distributing goods to verify the authenticity and thus the origin of the goods.

The identification protocol defined by the EPCglobal consortium is described with reference to FIG. 1.

In a prior stage (not shown), a radio reader R decides on a class of tag to be interrogated. By way of example, this may be all tags coming from a given manufacturer. It is assumed that a plurality of tags $T_1, \ldots, T_n$ satisfying this criterion are within radio range of a radio reader R.

In a first parameter-setting step E10, the reader R sets a value for a parameter written q that determines a range of time slots during which the tags in radio range of the reader are to be interrogated by the reader R. The number of time slots in the range is equal to $2^q$.

In a query step E11, the reader R transmits a query message QUERY over the radio channel, which message contains the number of time slots as determined beforehand, specifically $2^q$. In a selection step E12 performed after the reader R has transmitted the query message, the tags $T_1, \ldots, T_n$ in radio range of the reader R select respective time slots within the proposed range. Thus, the time slot selected by each tag is a number lying in the range 0 to $2^q-1$. This time slot is selected by each tag in random manner and it determines a particular time interval during which the tag is capable of replying to the reader, and possibly of being isolated by the reader R during the identification protocol in order to dialog in privileged manner with the reader in the context of a particular application, e.g. an authentication application.

A tag interrogated during a time slot that it has selected replies to the reader R by sending a 16-bit random value RN selected by the tag. The slot 0 is representative of the first slot associated with the query message QUERY sent by the reader R during step E11. It is assumed here that only the tag $T_j$ has selected 0 as its time slot. The tag $T_j$ is thus concerned by the query message QUERY received from the reader. The tag $T_j$ then acts in a reply step E13 to send a reply message REP to the reader R, which message includes a random value RN selected by the tag $T_j$.

In a test step E14, the reader R determines whether zero, one, or a plurality of tags have replied to the query message QUERY that it sent.

As specified above, it is assumed at this point that only the tag $T_j$ has replied. In a reply step E15, the reader R replies to the tag $T_j$ by sending an acknowledgment message ACK that includes the random value RN received from the tag $T_j$. Thus, the tag $T_j$ knows that the reader R has received its reply message correctly.

In an identification step E16, the tag $T_j$ sends an identification message ID to the reader R, which message includes an information sequence specific to the tag $T_j$. This sequence comprises a 16-bit character string known as its product code (PC) that identifies the capabilities of the tag, an electronic product code (EPC) on 64 to 128 bits that identifies the tag $T_j$ in unique manner, and a 16-bit cyclic redundancy code (CRC) for correcting errors, which CRC is determined on the basis of the code PC and the identifier EPC and serves to detect transmission errors.

In a second situation (not shown in FIG. 1) in which a plurality of tags reply to the query message QUERY sent by the reader R in step E11, the tags that have replied put themselves into a temporary waiting state, also known as a "hibernation" state. This situation corresponds to a collision between replies from tags that therefore cannot be processed by the reader R. The reader R sends a new query message, conventionally written QUERYREP, which message contains a following time slot. In a third situation (not shown in FIG. 1), in which no tag has replied to the query message QUERY, the reader R sends a new query message QUERYREP that includes the following time slot.

Once all of the time slots in the range $[0, 2^q-1]$ have been processed, the reader can transmit the query message QUERY once again in order to attempt to identify the tags that could not be identified while sending earlier query messages QUERY and QUERYREP.

At the end of identification step E16, all of the other tags $T_1, \ldots, T_{j-1}, T_{j+1}, \ldots, T_n$ are in a waiting state, either because they have entered into a hibernation state, or because they are not concerned by the current exchange. The reader R can then dialog with the tag $T_j$ that it has identified, in a manner that depends on the particular needs of an application. One such dialog is shown diagrammatically in FIG. 1 by a step E17 that is dedicated to an application. In the context of an embodiment of the present invention, an advantageous example is an authentication application that enables the reader R to ensure that the tag $T_j$ that has identified itself with the reader is indeed the tag that it holds itself out to be. It should be observed that such authentication takes place after the tag has identified itself during the above-described identification protocol.

There are several schemes in existence for authenticating a tag with a radio reader. For example a known authentication scheme is named "GPS" or "cryptoGPS" for its inventors Girault, Palliès, Poupard, and Stern [M. Girault, G. Poupard, and J. Stern "On the fly authentication and signature schemes based on groups of unknown order", Journal of Cryptology, pp. 463-488, Vol. 19, No. 4, 2006]. The GPS scheme is a public key authentication technique. It is a protocol of the "zero knowledge" type in which security relies on the difficulty of computing the discrete logarithm in a group. By way of example, implementation of this scheme may rely on cryptography based on elliptic curves.

This scheme is commonly used so that a device having very little power in terms of memory and/or computation power can authenticate itself with a second device having greater power. The protocol is such that the cost of authentication for the less-powerful device can usually be reduced by means of a series of optimizations. For example, one optimization of the GPS scheme relies on a so-called "coupon" mode. That mode consists in acting before an authentication session to calculate everything that can be calculated beforehand, so as to leave a minimum of operations that need to be performed while the authentication proper is taking place. This makes the GPS protocol very well adapted to applications based on RFID tags.

With reference to FIG. 2, there follows a description of an example of an implementation of a GPS authentication scheme for authenticating a radio tag with a reader and as used in the prior art. The example described here is based on elliptic curves; it uses a subgroup of points generated by a point P on a curve E. The implementation described here makes use of tag authentication coupons and of regenerating random numbers associated with each of those coupons by the tag, thus constituting an optimization in a basic GPS scheme. In this implementation, the arithmetic calculations on the elliptic curves are performed by the reader, and only basic arithmetic operations are executed by the tag. It can be understood that that example is most advantageous in terms of performance and implementation space for the tag.

In that scheme, an authentication system has at least one tag T adapted to authenticate itself with a reader R when the tag comes within the proximity of the reader R.

In conventional manner, the scheme comprises two stages: a configuration stage E20 during which the authentication data is calculated and/or supplied to the tag T and to the reader R, and an authentication stage E21 during which the tag T authenticates itself with the reader R. The configuration stage E20 need be performed only once in the lifetime of the system. The authentication stage E21 is executed each time the tag is authenticated with the reader R.

During the configuration stage E20, a pair of GPS keys (s, V) is generated. The pair comprises a secret key s and an associated public key V. The secret key s, specific to the tag T, is stored in the tag T and is never extracted or transmitted from the tag T. The public key V is accessible to the reader R. The keys s and V are linked, e.g. by means of the following formula: $V=-sP$, where P is a point on the elliptic curve E known to the reader R. In a variant, $V=sP$. In other words, the public key V is calculated by addition on the elliptic curve by adding the point P s times. In the presently-described implementation of the GPS scheme, sometimes known as the "reduced coupon" mode, a second secret key k, known as a regeneration key, is installed in the tag T. It is used as a parameter for a pseudo-random function (PRF) installed in the tag T.

During the configuration stage E20, in a configuration step E20-1, a predetermined number n of values are recalculated, which values are commonly referred to as authentication coupons of the tag and written $x_i$, $1 \leq i \leq n$. The coupon of index i is written $x_i$. The index i is an identification index of the coupon $x_i$. In order to calculate the coupon $x_i$, a random number $r_i$ is generated by means of the pseudo-random function PRF using the regeneration key k as the parameter and applied to the index i ($r_i=PRF_k(i)$). The random numbers $r_i$ (i.e. as output from the function PRF) are of large size, e.g. 1100 bits. The authentication coupon $x_i$ of the tag is then calculated using the following formula: $x_i=HASH(r_iP)$, where HASH is a known hashing function applied to adding the point P on the elliptic curve $r_i$ times. This addition, and to a lesser extent the evaluation of the hashing function HASH, are operations that are expensive in terms of calculation power. It is thus common practice for the coupons $x_i$ to be precalculated by a calculation entity (not shown) of the authentication system that is different from the tag T and from the reader R. The authentication coupons $x_i$ of the tag are then stored in the tag T in a memory (not shown) of the tag T for use during authentications with the reader R.

During the authentication stage E21, in an initial selection-and-sending step E21-1, the tag T that is authenticating itself selects a coupon $x_i$ of index i. At the end of step E21-1, the selected coupon $x_i$ is sent to the reader R.

In a step 21-2 of selecting and sending a challenge, the reader R generates a challenge c. The challenge c is generated randomly. At the end of step E21-2, the challenge c is sent by the reader R to the tag T.

In a regeneration and calculation step 21-3, the tag T regenerates the random number $r_i$. For this purpose, the pseudo-random function PRF installed in the tag T and parameterized by the secret regeneration key k is applied to the index i that identifies the coupon $x_i$. It is known that the pseudo-random function requires little calculation power from the tag T. The tag T then calculates a reply y to the challenge c using the following formula: $y=r_i+sc$. The reply y is the sum of the random number $r_i$ and the scalar product of the secret key s and of the challenge c. At the end of the step E21-3, the reply y is sent to the reader R.

In a verification step E21-4, the reader R verifies that the coupon $x_i$ received from the tag at the end of step E21-1 is equal to a value obtained by applying the hashing function HASH to addition on the elliptic curve of the point P y times, and to addition of the public key V c times, in other words: HASH(yP+cV).

If the verification is positive (branch "Ok" in FIG. 2), then the tag T has been correctly identified with the reader R.

By way of example, the function HASH may be the function SHA-1, where SHA stands for "secure hash algorithm".

It may be observed that when tag authentication is implemented in accordance with the scheme described with reference to FIG. 2, this necessarily takes place after the reader has isolated a particular tag during the identification protocol described with reference to FIG. 1. Implementing the identification protocol and then the authentication protocol in succession thus requires as many messages to be exchanged as there are exchanges in both of those protocols, and as much data to be transported as needs to be exchanged between the entities involved during these two protocols.

SUMMARY

An exemplary embodiment of the invention seeks to improve the situation by proposing a method of identifying and authenticating a radio tag when implemented by a radio reader, said tag forming part of a set of tags in radio range of the reader and having selected a time slot from a set of available time slots, the method comprising:
a step of the reader sending a query message during the selected time slot; and
a step of the reader receiving a reply message from the tag that selected the time slot, said reply message including a random value selected by the tag;
the method being characterized in that the tag stores authentication coupons and the reply from the tag received by the reader during the time slot contains, as a random value selected by the tag, a value that is a function of one of said coupons.

The identification and authentication method of the an embodiment of invention serves to mutualize steps that were initially distinct and implemented using distinct protocols for identifying and for authenticating a radio tag. In an embodiment of the invention, a value that is a function of an authentication coupon replaces the random value that is usually transmitted to the reader by the tag when it replies to the query message of the reader relating to the time slot as selected by the tag during the identification protocol. Thus, in order to reply to the interrogation from the reader, the tag sends only one message both announcing the time slot that has been selected by the tag and also identifying the tag. In the prior art, it should be recalled that two messages were sent: a first message specific to the identification protocol and containing a 16-bit random number; and a second message specific to the authentication protocol and containing a value that is a function of an authentication coupon that is likewise of a random nature. With the method of an embodiment of the invention, the value that is a function of the authentication coupon is used both to identify and to authenticate the tag. In one implementation, this value is the coupon itself. The method of an embodiment of the invention serves to minimize the number of messages that are exchanged while identifying and authenticating a tag.

In an implementation, the method further comprises:
a step of the reader sending an acknowledgment message to said tag, the acknowledgment message being established as a function of the random value and including a challenge selected by the reader; and
a step of the reader receiving an identification message from the tag, the identification message including identification information.

The acknowledgment message conventionally transmitted by the reader to the tag in order to let the tag know that the reader has received its reply correctly is also used to transmit a challenge c to the tag. The challenge is conventionally sent during authentication. Once again, only one message is used to transmit two pieces of information to the tag that would conventionally be processed separately firstly during identification and secondly during authentication. Once again, the number of messages exchanged between the reader and the tag is reduced, compared with the number of messages exchanged when the identification protocol and the authentication protocol run on one after the other as in the prior art.

In an implementation, the identification message includes an authentication reply calculated from the challenge and from a secret specific to the tag, the method including:
a step of the reader verifying that the random value contained in the reply message received from the tag is equal to a value calculated from the authentication reply and from the challenge, with authentication of the tag being successful when the verification is positive.

In this implementation, the tag is authenticated at the same time as it is identified. No additional authentication stage is then needed. It should be observed that with the method of an embodiment of the invention, the number of messages exchanged between the tag and the reader is halved. Likewise, the quantity of data exchanged between the tag and the reader is also reduced. The authentication coupon (or a value that is a function of the coupon) that is of a random nature and that is usually sent during the authentication protocol, and the random value selected by the tag that is usually sent during the identification protocol are now a single piece of data. This data is transmitted once only and it acts both as a random value in the meaning of the identification protocol and as an engagement in the meaning of the authentication protocol.

It should be observed that with the method of an embodiment of the invention and with the optimizations it provides in terms of number of messages and quantity of data exchanged, the time required for identifying and authenticating is reduced compared with the prior art.

In an implementation, the acknowledgment message includes data that is a function of the authentication coupon.

In a variant implementation, the reply message from the tag also includes a second random number, and the acknowledgment sent by the reader is also established as a function of the second random number.

This implementation enables the reader and the tag to authenticate each other mutually. The sending of a second random number by the tag as a challenge to the reader contributes to authenticating the reader by the tag. A reply to this challenge is then calculated by the reader and then transmitted to the tag in the following message. It should be observed that the number of messages remains unchanged, whether for identifying and authenticating the tag or for authenticating the tag and the reader.

An embodiment of the invention also provides a method of identifying and authenticating a tag with a radio reader, the tag being within radio range of the reader, said tag having selected a time slot from a set of available time slots, the method comprising:
a step of receiving a query message from the reader during the selected time slot; and
a step of sending a reply message from the tag to the reader, said reply message including a random value selected by the tag;

the method being characterized in that the tag stores authentication coupons, and the reply from the tag sent to the reader contains a random value selected by the tag, which value is a function of one of said coupons.

In a variant implementation, the method of authenticating a tag also comprises:
- a step of receiving an acknowledgment message from the reader, which message is established as a function of the random value and includes a challenge selected by the reader; and
- a step of sending an identification message to the reader, which message includes identification information.

In a variant implementation of the method of authenticating a tag, the identification message sent to the reader also includes an authentication reply calculated from the challenge and from a secret specific to the tag.

An embodiment of the invention also provides a reader adapted to identify and authenticate a radio tag, said tag forming part of a set of tags in radio range of the reader and having selected a time slot from among a set of available time slots, the tag storing authentication coupons and the reader comprising:
- first send means arranged to send a query message during the selected time slot;
- first reception means arranged to receive a reply message from the tag that has selected the time slot, said reply message including a random value selected by the tag, which value is a function of one of said authentication coupons; and
- verification means arranged to verify how many reply messages have been received by the first reception means during the selected time slot.

An embodiment of the invention also provides a radio tag adapted to be identified and authenticated by a radio reader, the tag comprising:
- means for storing authentication coupons;
- selector means arranged to select a time slot from a set of available time slots;
- first reception means arranged to receive a query message from the reader during the time slot selected by the selector means; and
- first send means arranged to send a reply message to the reader, the reply message including a random value selected by the tag constituted by one of said authentication coupons.

An embodiment of the invention also provides a radio authentication system comprising:
- a radio reader of an embodiment of the invention; and
- at least one radio tag of an embodiment of the invention.

An embodiment of the invention also provides a computer program for installing in a memory of a radio reader, the program including instructions for implementing steps of the radio tag identification and authentication method by a reader of an embodiment of the invention, which steps are executed by the reader when the program is executed by a processor.

An embodiment of the invention also provides a data medium having the computer program of the invention stored thereon.

BRIEF DESCRIPTION OF THE DRAWINGS

Numerous details and advantages of an embodiment of the invention can be better understood on reading the following description of a particular implementation made with reference to the accompanying diagrams in non-limiting manner and in which.

DETAILED DESCRIPTION OF ILLUSTRATIVE EMBODIMENTS

Figure 3:
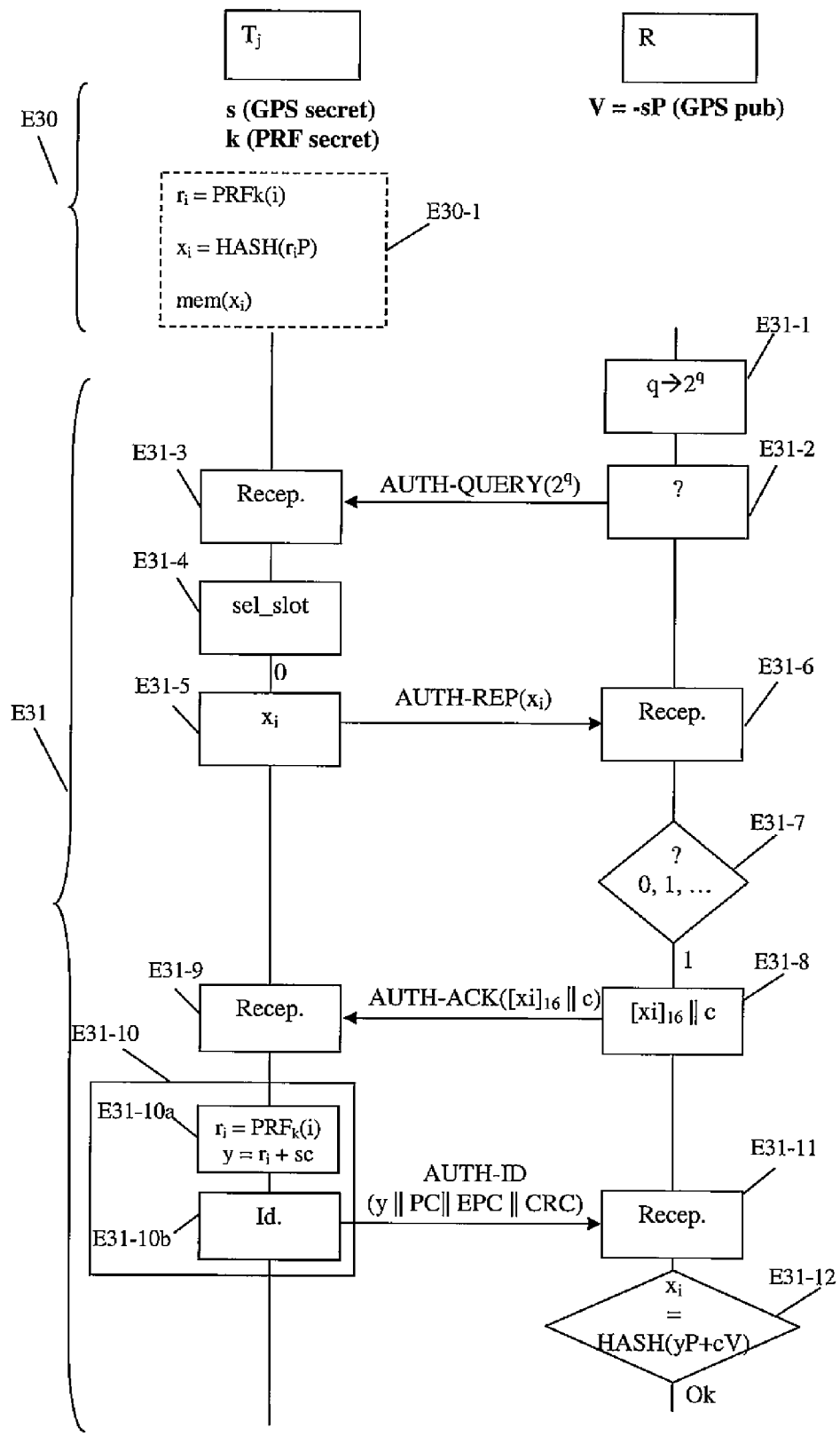
FIG. 3 shows the steps of a method constituting an implementation of the invention for identifying and authenticating a tag by a reader.

The steps of a method of identifying and authenticating a radio tag by a reader in an implementation of the invention are described below with reference to FIG. 3.

It is assumed that a plurality of tags $T_1, \ldots, T_n$ are within radio range of a radio reader R. For reasons of legibility, only one tag $T_j$ is shown in FIG. 3.

The method of an embodiment of the invention comprises two stages: a configuration stage E30 during which authentication data is calculated and/or supplied to the tags $T_1, \ldots, T_n$ and to the reader R, and an operational stage E31 during which the reader R proceeds to identify and authenticate a tag $T_j$. The configuration stage E30 need be performed only once in the lifetime of the system. The operational stage E31 is executed each time a tag is identified and authenticated by the reader R. The description below relates to the stage of configuring the tag $T_j$ only. It should be understood that such a configuration stage is also performed for each of the other tags $T_1, \ldots, T_{j-1}, T_{j+1}, \ldots, T_n$.

During the configuration stage E30, a pair of GPS keys (s, V) specific to the tag $T_j$ is generated. The pair comprises a secret key s and an associated public key V. The secret key s, specific to the tag $T_j$, is stored in the tag $T_j$ and is never extracted or transmitted from the tag $T_j$. The public key V is accessible to the reader R. The keys s and V are linked, e.g. by means of the following formula: $V=-sP$, where P is a point on an elliptic curve E known to the reader R. In a variant, $V=sP$. In other words, the public key V is calculated by adding the point P s times over on the elliptic curve E. In the presently-described implementation of the GPS scheme, sometimes known as the "reduced coupon" mode, a second secret key k, known as a regeneration key, is installed in the tag $T_j$. It is used as a parameter for a pseudo-random function (PRF) installed in the tag $T_j$.

During the configuration stage E30, in a configuration step E30-1, a predetermined number m of values are recalculated, which values are commonly referred to as authentication coupons of the tag and written $x_i$, $1 \le i \le m$. The coupon of index i is written $x_i$. The index i is an identification index of the coupon $x_i$. In order to calculate the coupon $x_i$, a random number $r_i$ is generated by means of the pseudo-random function PRF using the regeneration key k as the parameter and applied to the index i ($r_i=PRF_k(i)$). The random numbers $r_i$ (i.e. as output from the function PRF) are of large size, e.g. 1100 bits. The authentication coupon $x_i$ of the tag is then calculated using the following formula: $x_i=HASH(r_iP)$, where HASH is a known hashing function applied to adding the point P $r_i$ times over on the elliptic curve. This addition, and to a lesser extent the evaluation of the hashing function HASH, are operations that are expensive in terms of calculation power. It is thus common practice for the coupons $x_i$ to be precalculated by a calculation entity (not shown) of the system that is different from the tag $T_j$ and from the reader R. The authentication coupons $x_i$ of the tag are then stored in the tag $T_j$ in a memory (not shown) for use during identifications and authentications with the reader R.

In a prior step (not shown) of the operational stage E31, the reader R decides on a class of tag to query. By way of example this may be all of the tags from the same manufacturer.

In a first step E31-1 of parameterizing the operational stage E31, the reader R sets a value for a parameter written q and determines a range of time slots during which the tags within radio range of the reader will be interrogated by the reader. The number of time slots in the range is equal to $2^q$.

In the query step E31-2, the reader R transmits a query message AUTH-QUERY specifying the series of time slots as determined beforehand. The query message is received by the tags, and in particular by the tag $T_j$, in a reception step E31-3. After the tag has received the query message AUTH-QUERY, during a selection step E31-4, each of the tags $T_1, \ldots, T_n$ within radio range of the reader R selects randomly respective time slots from within the proposed range. Thus, the time slot selected by each tag is identified by a number in the range 0 to $2^q-1$. After the tags have selected their time slots, each of them waits for an interrogation from the reader R relating to that time slot.

In the particular example described herein, it is assumed that:

during the selection step E31-4, the tag $T_j$ selects the time slot 0, which is representative of the first slot in the series of slots determined by the reader R;

the first query message AUTH-QUERY from the reader R that is sent during the step E31-2 announces the time slot 0; and only the tag $T_j$ has selected the time slot 0.

In a reply step E31-5, the tag $T_j$ sends a response message AUTH-REP to the reader R, which message contains a value that is a function of an authentication coupon $x_i$. In the particular example described herein, this value is equal to the authentication coupon $x_i$ itself. It should be recalled that the coupon $x_i$ was calculated using the following formula: $x_i=\mathrm{HASH}(r_iP)$, where P is a point on the elliptic curve E, and $r_i$ is a random number. The authentication coupon $x_i$ acts as a random value selected by the tag $T_j$ and inserted by the tag $T_j$ into the reply message AUTH-REP. The reply message AUTH-REP is received by the reader R in a reception step E31-6.

In a test step E31-7, the reader R determines how many tags have replied to the query message AUTH-QUERY. As specified above, in this example it is assumed that only the tag $T_j$ has replied.

In a reply step E31-8, the reader R replies to the tag $T_j$ by sending an acknowledgment message AUTH-ACK for the received reply. The acknowledgment message includes data that is a function of the received authentication coupon $x_i$, together with a challenge c. In conventional manner, the challenge is a random value selected by the reader R. By way of example, the data is a portion of the coupon, and in this example it corresponds to the 16 least-significant bits of the coupon $x_i$; this is written $[x_i]_{16}$. For example, the portion of $x_i$ that is sent, i.e. $[x_i]_{16}$ and the challenge c are concatenated. Thus, the acknowledgment message AUTH-ACK includes a concatenated value written $[x_i]_{16}\|c$. In a reception-and-verification step E31-9, the acknowledgment message is received by the tag $T_j$, which verifies that the value $[x_i]_{16}\|c$ it has received is indeed associated with the coupon $x_i$ that it sent. Given the random nature of the authentication coupon, when the tag $T_j$ compares the portion of the coupon $[x_i]_{16}$ that it has received in the acknowledgment with the 16 least-significant bits of the coupon $x_i$ that it sent, and when the values are equal, the tag is certain that the reader R has correctly received its reply message. It should be observed that the challenge c sent in the acknowledgment message is data for use in authenticating the tag $T_j$ by the reader R.

In an identification and authentication step E31-10, the tag $T_j$ calculates an authentication reply to the challenge c it has received from the reader, and then it sends the authentication reply together with identification information specific to the tag $T_j$. Thus, in a regeneration-and-calculation substep E31-10a, the random number $r_i$ is regenerated by the tag $T_j$. For this purpose, the pseudo-random function PRF installed in the tag $T_j$ and parameterized by the regeneration secret key k is applied to the index i that identifies the coupon $x_i$. It is known that the pseudo-random function requires little calculation power for the tag $T_j$. The tag $T_j$ then calculates a reply y to the challenge c using the following formula: $y=r_i+sc$. The reply y is the sum of the random number $r_i$ and the scalar product of the secret key s and the challenge c. Thereafter, in a sending substep E31-10b, the tag $T_j$ sends an authentication message AUTH-ID to the reader, which message includes the authentication reply y together with an identification sequence specific to the tag $T_j$. The sequence specific to the tag comprises a 16-bit character string written "PC" (for "product code"), which identifies the capacities of the tag, an electronic product code "EPC" on 64 to 128 bits that identifies the tag uniquely, and a 16-bit cyclic-redundancy code "CRC" for error correcting that is determined on the basis of the code PC and the identifier EPC and that serves to detect transmission errors. The identification message AUTH-ID is obtained by concatenating all of the data y, PC, EPC, and CRC, and the result of this concatenation is written $y\|PC\|EPC\|CRC$. The identification message is received by the reader in a reception step E31-11.

In a verification step E31-12, the reader R verifies that the coupon received from the tag $T_j$ during the reception step E31-6 is equal to a value obtained by applying the hash function HASH while adding the point P at y times over using addition on the elliptic curve, and adding the public key V c times over. In other words, the received coupon is compared with HASH(yP+cV). If the verification is positive (branch Ok in FIG. 3), then the tag $T_j$ has been correctly authenticated with the reader R.

Thus, if the verification performed in step E31-12 is positive, the reader R holds identification data specific to the tag $T_j$ and has also authenticated the tag $T_j$.

At the end of the step E31-12, all of the radio tags other than the tag $T_j$ are in a waiting state since, in this example, the time slots they have selected have not been involved in a query message from the reader R.

By way of example, the HASH function is the function SHA-1 (for "secure hash algorithm").

Exchanges may also take place between the tag $T_j$ and the reader R. These exchanges (not described herein) are then specific to an application. Once the exchanges between the tag $T_j$ and the reader R have terminated, the tag $T_j$ enters a hibernation state. If the reader desires to interact with other tags of the set, it sends a new interrogation message AUTH-QUERYREP that specifies the following time slot. This interrogation step is comparable to the interrogation step E31-2.

For a given time slot, and when only one tag replies to the reader, the steps E31-3 to E31-12 are executed as described above.

Figure 1:
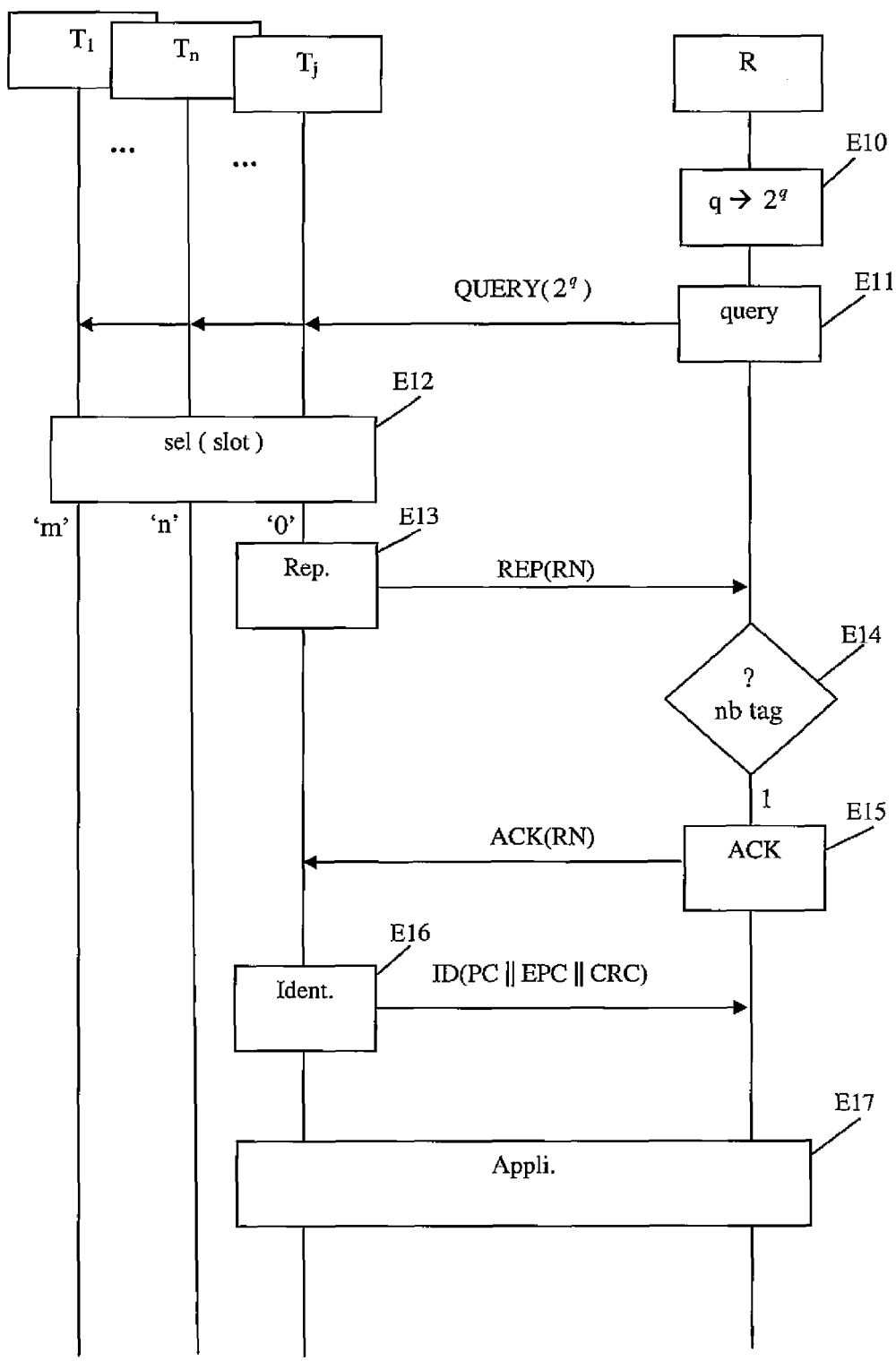
FIG. 1 (described above) shows the steps of a prior art protocol for identifying a radio tag by a radio reader.
Figure 2:
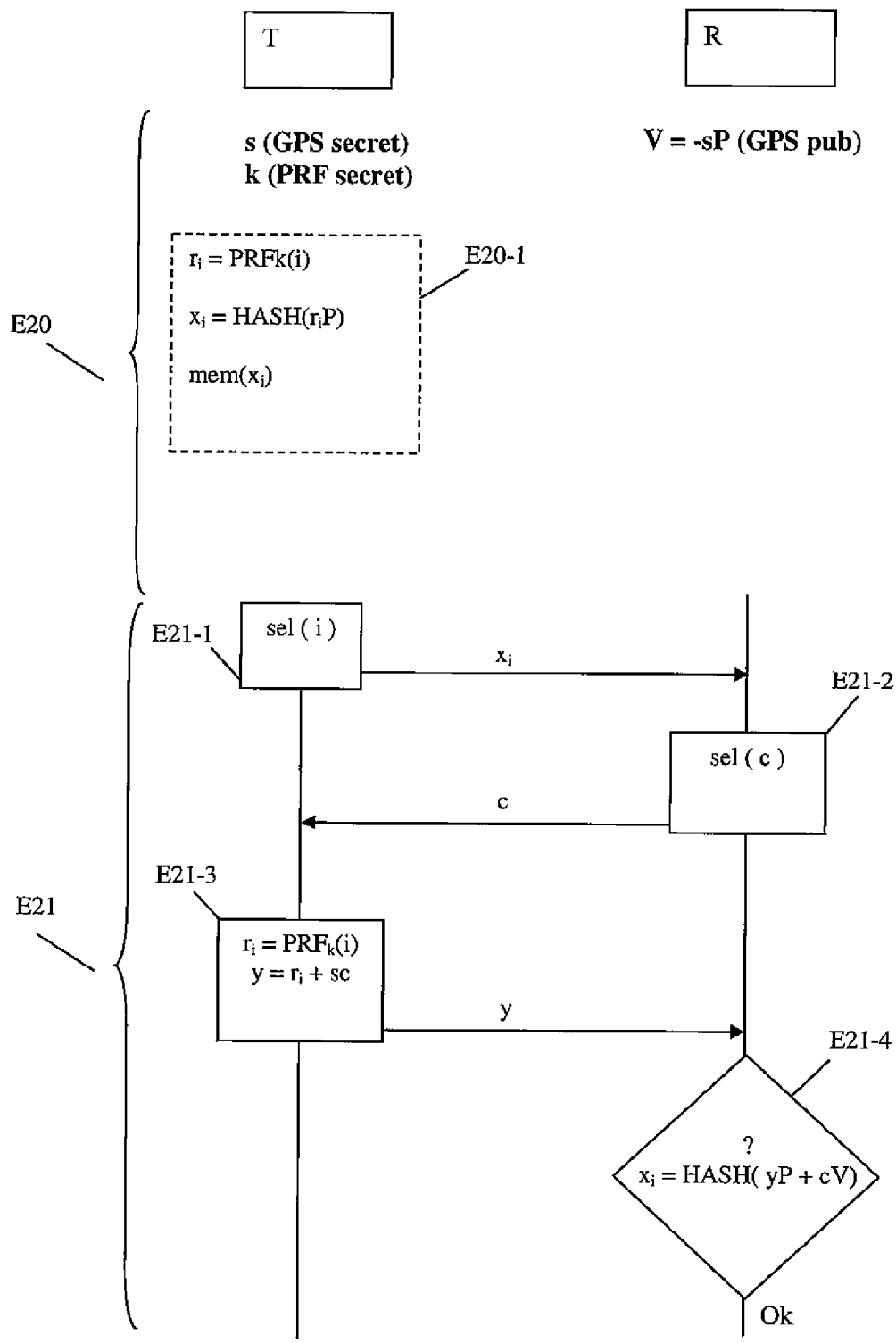
FIG. 2 (described above) shows the steps of a prior art scheme for authenticating a tag with a reader, and specifically the GPS scheme.

In the situation (not shown in FIG. 1) where a plurality of tags reply to an interrogation message AUTH-QUERY sent by the reader R during the step E31-2 (or to a message AUTH- QUERYREP sent for a following time slot), the tags that have replied put themselves into a temporary waiting state or hibernation state. This situation corresponds to a collision between replies from tags that therefore cannot be processed by the reader R.

In the situation (not shown in FIG. 1) where no tag has replied to a query message AUTH-QUERY sent by the reader R during the step E31-2, then the reader R sends a new query message AUTH-QUERYREP that specifies the following time slot.

Once all of the time slots in the range $[0, 2^q-1]$ have been processed by the reader R, the reader can send a new query message AUTH-QUERY in order to identify and authenticate the tags that were not identified and authenticated during the preceding exchanges.

As mentioned above, it is assumed that the tag $T_j$ has selected the time slot 0. Naturally, the tag could have selected any of the time slots. Where appropriate, it waits to receive from the reader R a new query message AUTH-QUERYREP that specifies the time slot that it has selected in order to send one of its authentication coupons in reply, in accordance with the above-described reply step E31-5.

In the cryptoGPS variant described herein, the values $r_i$ used for calculating the authentication coupons using the formula $x_i=\mathrm{HASH}(r_iP)$ are regenerated by the tag $T_j$ when the coupon is actually used, specifically in this example during the substep 31-10a. Thus, only the coupon $x_i$ needs to be stored by the tag $T_j$. This is advantageous when the tag has limited storage memory.

The invention is not limited to the described cryptoGPS variant. Other variants of that scheme exist. Thus, in another implementation of the GPS scheme (not shown) that constitutes an optimization of the scheme, the authentication coupons $x_i$ of the tag are precalculated by a calculation entity other than the reader R and the tag $T_j$ and they are stored in the reader, or they are delivered to the reader by the calculation entity via a communications channel. Under such circumstances, the reply message sent by the tag $T_j$ during the reply step E31-5 includes a value that is a function of a random number RN selected by the tag and of a coupon index CID that tells the reader which coupon $x_i$ is being used by the tag during the current exchanges. Thus, the response message depends on the coupon in the sense that an index for the coupon is specified, and furthermore the random nature thereof is conserved since the random number RN is used for calculating the reply from the tag. The value transmitted in the reply is written g(RN, CID). The function g may for example comprise concatenating the random number RN and the coupon index CID.

Usually, after the configuration stage E30, the regeneration secret key k is present only in the tag, it never leaves the tag, and it is not designed to be shared with any other entity, except possibly the calculation entity used for precalculating the authentication coupons of the tag. The regeneration secret key k is different from the secret key s. Nevertheless, in an implementation of the GPS scheme, it may be derived from the secret key s.

In another variant of the cryptoGPS authentication scheme, the authentication coupons that are stored in the tag $T_j$ and transmitted to the reader R are pairs $(r_i, x_i)$ or so-called "non-reduced coupons". In this variant, the random numbers $r_i$ are thus stored in the tag and they are not regenerated, as they are in the scheme described above. It should be observed that this variant is less advantageous in terms of memory space occupation in the tag $T_j$ since it requires the tag to store more information.

In another implementation of the cryptoGPS scheme, the coupons are likewise pairs $(r_i, x_i)$, with $x_i=\mathrm{HASH}(r_iP)$. The value $r_i$ is a random number, and P is a point on the elliptic curve E. By way of example, the function HASH represents the "SHA-1" cryptographic hashing function.

In general, an embodiment of the invention extends to any authentication protocol based on exchanges between a first entity conventionally referred to as the "prover" and a second entity, conventionally referred to as the "verifier" in an engagement involving authentication, a challenge, and an authentication reply.

In another implementation of the invention, in the reply step E31-5, the value that is transmitted by the tag and that is a function of the coupon is obtained by extracting certain bits from the coupon $x_i$. For example, the value is obtained by selecting 16 bits of the coupon $x_i$.

In another example, the value is obtained by selecting a fraction of the coupon, which fraction is smaller than the original coupon $x_i$.

In another implementation of the invention, in the reply step E31-5, the value transmitted by the tag in the reply message includes a random number selected by the tag and an authentication coupon $x_i$. Thus, in a single message, the tag sends the authentication coupon as conventionally sent during an authentication protocol such as cryptoGPS, and a random number as conventionally sent during an identification protocol.

Furthermore, the invention is not limited to an acknowledgment message AUTH-ACK sent by the reader R and containing the concatenation of the 16 least-significant bits of the coupon $x_i$ and of the challenge c ($[x_i]_{16}\|c$) (or in the above-described example the concatenation of the challenge and of the value that is a function of the coupon). Thus, in another implementation of the invention, the acknowledgment AUTH-ACK sent by the reader in step E31-8 includes a resulting value that is a function of the authentication coupon received from the reader R during the step E31-6 and of the challenge c selected by the reader. Thus, in this example, the acknowledgment message AUTH-ACK includes a value, written $h(x_i,c)$ corresponding to applying a function h to the coupon $x_i$ and to the challenge c.

In another implementation, a portion of the reply message AUTH-REP sent by the tag $T_j$ during the step E31-5 corresponds to a random number c'. This random number may advantageously be used during authentication of the reader by tag, the method then implementing mutual authentication of the tag and of the reader. In this example, the reader R sends a value in the acknowledgment message AUTH-ACK that is a function of the authentication coupon $x_i$, of the challenge c, and of the random number received from the tag. The value that is transmitted is written $h'(x_i,c,c')$.

Figure 4:
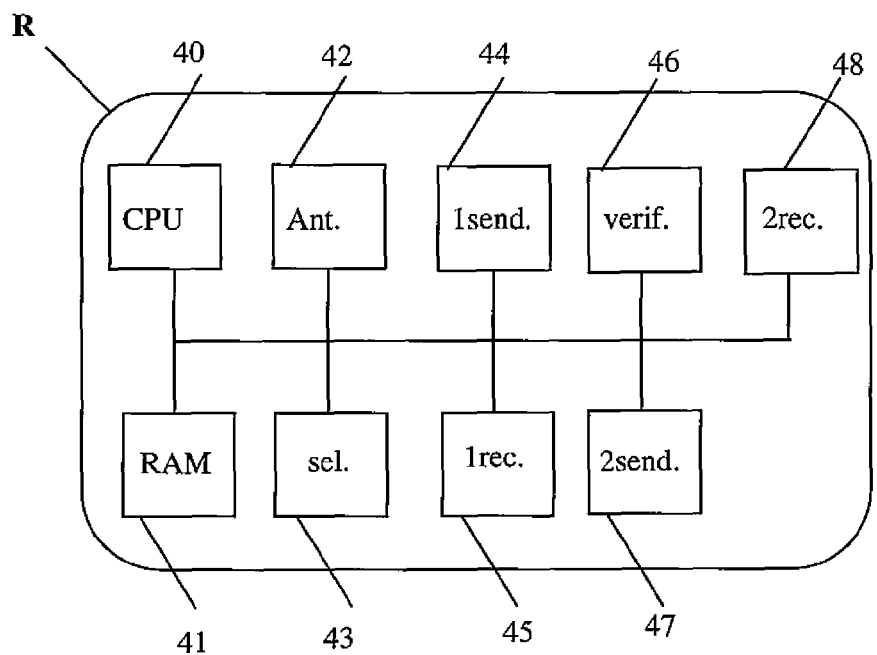
FIG. 4 shows an embodiment of a radio reader arranged to identify and authenticate a radio tag shown in FIG. 5.

A radio reader R in a particular embodiment of the invention is described below with reference to FIG. 4.

The radio reader R is an active device, transmitting at radio frequencies and activating a set of tags (not shown in FIG. 4) that come within its proximity by supplying them with the energy that they need. The reader R of an embodiment of the invention is adapted to dialog with the tags of the set in order to identify and authenticate a particular tag $T_j$ in the set (not shown in FIG. 4) during an identification and authentication sequence in accordance with the step of the method of an embodiment of the invention as described above. Each tag of the step stores authentication coupons that are specific thereto and that are written $x_i$.

The reader R has a plurality of modules:

a processor module 40 or central processor unit (CPU);

a set of memories including a volatile random access memory (RAM) 41 used for executing code instructions, storing variables, etc.;

an antenna 42 suitable for transmitting and receiving over the radio channel;

a selector module 43 for selecting an operational module q that defines a set of time slots during which the reader is going to send query messages to the tag. The number of time slots is defined from the operational parameter q; it is equal to $2^q$. The selector module 43 is adapted to implement the step E31-1 of the identification and authentication method described with reference to FIG. 3;

a first module that, being coupled to the antenna 42, constitutes a first send module 44 arranged to send a query message AUTH-QUERY or AUTH-QUERYREP during a time slot. Thus, depending on its nature, a query message specifies a current time slot for the number of time slots defined on the basis of the operational parameter. It is conventional for the first message of the AUTH-QUERY type to transmit the number of time slots ($2^q$) and to be associated with a first time slot that is identified by the value 0. A following query message, written AUTH-QUERYREP, transmits a current time slot value. The first send module 44 is adapted to implement the step E31-2 of the method described with reference to FIG. 3. It is also adapted to implement a step (not shown in FIG. 3) of sending a new query message AUTH-QUERYREP after the reader has received zero or a plurality of replies from tags during a preceding time slot;

a second module that, when coupled to the antenna 42, constitutes a first reception module 45 that is arranged to receive a reply message from one or more tags of the sets that have selected the current time slot. The reply message sent by a tag includes a value that is a function of one of said authentication coupons specific to the tag, with this constituting the random value selected by the tag. The first reception module 45 is adapted to implement the step E31-6 of the method described with reference to FIG. 3;

a verification module 46 arranged to verify that the first reception means 45 have received only one reply message during the selected time slot. Since the number of reply messages represents the number of tags that have replied to the query message, the verification module 46 thus verifies how many tags have replied to the reader during the selected time slot. The verification module 46 is adapted to implement the verification step E31-7 described with reference to FIG. 3;

a third module that, when coupled with the antenna 42 constitutes a second send module 47, is arranged to send an acknowledgment message to a single tag under the control of the verification means 46, which message is established as a function of the random value. Thus, the second send module 47 is activated only if the verification module 46 has verified that only one tag replied to the query message sent by the first send module 44. The second send module 47 is adapted to implement the step E31-8 of the identification and authentication method; and a fourth module that, when coupled with the antenna 42 constitutes a second reception module 48, is arranged to receive an identification message from a tag, specifically from the only tag that replied, which message includes identification information. The second reception module receives the identification message only after the second send module 47 has sent an acknowledgment message. Thus, the second reception module 48 receives an identification message only when a single tag has replied to the reader. The second reception module 48 is adapted to implement the reception step E31-11 of the method as described with reference to FIG. 3.

The modules communicate via a communications bus. The modules 43, 44, 45, 46, 47, and 48 are preferably software modules comprising software instructions for causing the steps of the identification and authentication method of an embodiment of the invention to be executed.

An embodiment of the invention thus also provides:

a computer program including instructions for implementing those of the steps of the method of identifying and authenticating a tag that are performed by the reader, when the program is executed by a processor; and a reader-readable recording medium having the above-described computer program recorded thereon.

The software modules may be stored in or transmitted by a data medium. The medium may be a hardware storage medium, e.g. a compact disk read-only memory (CD-ROM), a magnetic floppy disk or hard disk, or indeed a transmission medium such as a signal, or a telecommunications network.

In a variant embodiment of the invention, the reader R includes communications means (not shown) for communicating with a calculation entity adapted to request and receive a coupon for a current authentication.

In a particular embodiment of the invention that is not described in detail, the tags are active devices. The tags then have their own batteries enabling them to transmit signals. Thus, the tags and the reader R are capable of interacting over a distance that is greater than is possible when the tags are passive devices that receive their energy from the reader.

Figure 5:
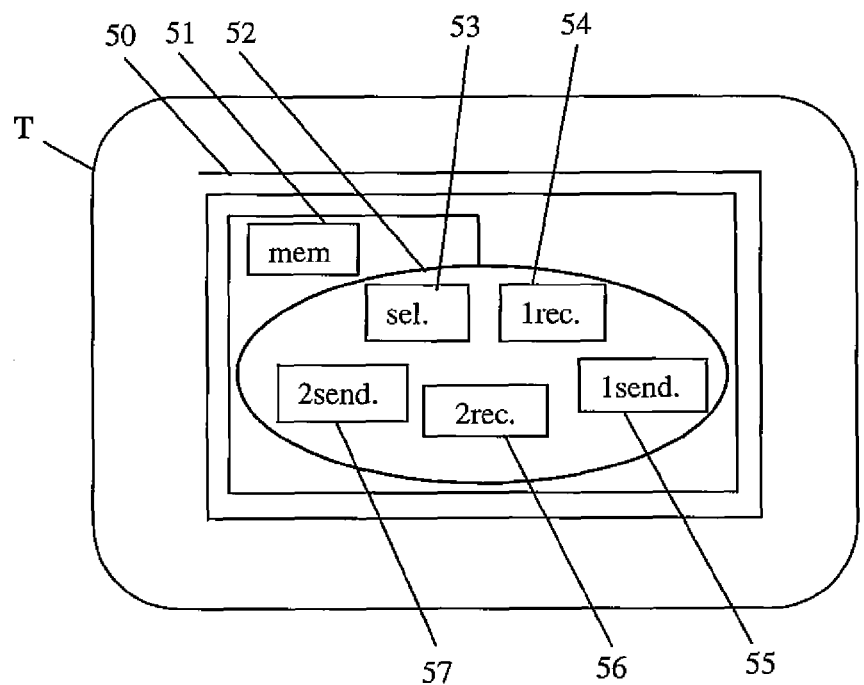
FIG. 5 shows an embodiment of a tag arranged to identify and authenticate itself with a radio reader of an embodiment of the invention.

A radio tag T in a particular embodiment of the invention is described below with reference to FIG. 5. The tag T is adapted to dialog with a radio reader (not shown in FIG. 5) during an identification and authentication sequence in accordance with the steps of the above-described method.

In the particular example described herein, the tag T is a passive device receiving its energy from the radio reader while it is being queried thereby. The tag T comprises:

an antenna 50 adapted to send to the reader and to receive from the reader;

storage means 51, such as a memory, suitable for storing a secret key s forming part of a GPS pair of private and public keys (s, V), a first regeneration key k, a pseudo-random function PRF, and authentication coupons $x_i$ of the tag, when such coupons are precalculated;

a silicon chip 52 having a plurality of transistors adapted to constitute logic gates of a non-programmable hard-wired logic circuit. The logic circuit defines:

selector means 53 arranged to select a time slot from a set of available time slots;

first means that, when coupled with the antenna 50, constitute first reception means 54 arranged to receive a query message from the reader during the time slot selected by the selector means 53;

second means that, when coupled with the antenna 50, constitute first send means 55 arranged to send a reply message to the reader, the message including a value that is a function of one of said authentication coupons as a random value selected by the tag;

third means that, when coupled with the antenna 50, constitute second reception means 56 arranged to receive an acknowledgment message from the reader, which message is established as a function of the authentication coupon; and fourth means that, when coupled to the antenna 50, constitute second send means 57 arranged to send an identification message to the reader, which message includes identification information. The identification message also includes an authentication reply y, calculated from data specific to the tag and from the challenge received from the reader.

The selector means 53 are adapted to implement the step E31-4 described with reference to FIG. 3. The first reception means 54 are adapted to implement the step E31-3 of the identification and authentication method. The first send means 55 are adapted to implement the step E31-5 described with reference to FIG. 3. The second reception means 56 are adapted to implement the step E31-9 described with reference to FIG. 3. The second send means 57 are adapted to implement the step E31-10 of the identification and authentication method described with reference to FIG. 3.

An embodiment of the invention also provides an identification and authentication system comprising a reader R such as that described with reference to FIG. 4 and at least one tag such as that described with reference to FIG. 5. The system is suitable for implementing the steps of the method described with reference to FIG. 3.

Although the present disclosure has been described with reference to one or more examples, workers skilled in the art will recognize that changes may be made in form and detail without departing from the scope of the disclosure and/or the appended claims.

The invention claimed is:

1. A method of identifying and authenticating a radio tag when implemented by a radio reader, said tag forming part of a set of tags in a radio range of the reader and having selected a time slot from a set of available time slots, the method comprising:
   a step of the reader sending a query message comprising the set of available time slots;
   a step of the reader receiving during the selected time slot, a reply message from the tag that selected the time slot, said reply message including a random value selected by the tag, wherein the tag stores authentication coupons and the reply from the tag received by the reader during the time slot contains, as a random value selected by the tag, a value that is a function of one of said coupons,
   a step of the reader sending an acknowledgment message to said tag, the acknowledgment message being established as a function of the random value and including a challenge selected by the reader; and
   a step of the reader receiving an identification message from the tag, the identification message including identification information and an authentication reply calculated from the challenge.

2. The method according to claim 1, wherein the authentication reply is calculated from the challenge and from a secret specific to the tag, the method including:
   a step of the reader verifying that the random value contained in the reply message received from the tag is equal to a value calculated from the authentication reply and from the challenge, with authentication of the tag being successful when the verification is positive.

3. The method according to claim 1, wherein the acknowledgment message includes data that is a function of the authentication coupon.

4. The method according to claim 1, wherein the reply message from the tag also includes a second random number, and the acknowledgment sent by the reader is also established as a function of the second random number.

5. A method of identifying and authenticating a tag with a radio reader, the tag being within a radio range of the reader, said tag having selected a time slot from a set of available time slots, the method comprising:
   a step of the tag receiving a query message from the reader comprising the set of available time slots;
   a step of the tag sending during the selected time slot a reply message to the reader, said reply message including a random value selected by the tag, wherein the tag stores authentication coupons, and the reply from the tag sent to the reader contains a random value selected by the tag, which value is a function of one of said coupons;
   a step of the tag receiving from the reader an acknowledgment message, the acknowledgment message being established as a function of the random value and including a challenge selected by the reader; and
   a step of the tag sending an identification message to the reader, the identification message including identification information and an authentication reply calculated from the challenge.

6. The method according to claim 5, wherein the authentication reply is calculated from the challenge and from a secret specific to the tag.

7. A reader adapted to identify and authenticate a radio tag, said tag forming part of a set of tags in a radio range of the reader and having selected a time slot from among a set of available time slots, the tag storing authentication coupons, wherein the reader comprises:
   first send means arranged to send a query message comprising the set of available time slots;
   first reception means arranged to receive during the selected time slot, a reply message from the tag that has selected the time slot, said reply message including a random value selected by the tag, which value is a function of one of said authentication coupons;
   verification means arranged to verify how many reply messages have been received by the first reception means during the selected time slot;
   second send means arranged to send an acknowledgment message to said tag, the acknowledgment message being established as a function of the random value and including a challenge selected by the reader; and
   second reception means arranged to receive an identification message from the tag, the identification message including identification information and an authentication reply calculated from the challenge.

8. A radio tag adapted to be identified and authenticated by a radio reader, the tag comprising:
   means for storing authentication coupons;
   selector means arranged to select a time slot from a set of available time slots;
   first reception means arranged to receive a query message from the reader comprising the set of available time slots;
   first send means arranged to send a reply message to the reader during the time slot selected by the tag, the reply message including a random value selected by the tag constituted by one of said authentication coupons;
   second reception means arranged to receive from the reader an acknowledgment message, the acknowledgment message being established as a function of the random value and including a challenge selected by the reader; and
   second send means, arranged to send an identification message to the reader, the identification message including identification information and an authentication reply calculated from the challenge.

9. A radio authentication system comprising:

a radio reader; and at least one radio tag;

wherein the radio reader is adapted to identify and authenticate the at least one radio tag, said tag forming part of a set of tags in a radio range of the reader and having selected a time slot from among a set of available time slots, the tag storing authentication coupons, wherein the reader comprises:

first send means arranged to send a query message comprising the set of available time slots;

first reception means arranged to receive during the selected time slot a reply message from the tag that has selected the time slot, said reply message including a random value selected by the tag, which value is a function of one of said authentication coupons;

verification means arranged to verify how many reply messages have been received by the first reception means during the selected time slot;

second send means arranged to send an acknowledgment message to said tag, the acknowledgment message being established as a function of the random value and including a challenge selected by the reader; and second reception means arranged to receive an identification message from the tag, the identification message including identification information and an authentication reply calculated from the challenge; and wherein the radio tag comprises:

means for storing the authentication coupons;

selector means arranged to select the time slot from the set of available time slots;

first reception means arranged to receive the query message from the reader;

first send means arranged to send the reply message to the reader during the time slot selected by the selector means;

second reception means arranged to receive from the reader an acknowledgment message, the acknowledgment message being established as a function of the random value and including a challenge selected by the reader; and second send means, arranged to send an identification message to the reader, the identification message including identification information, and an authentication reply calculated from the challenge.

10. A non-transitory data medium comprising a computer program stored thereon, the program including instructions for implementing steps of a method for identifying and authenticating a radio tag implemented by a radio reader when the program is executed by a processor, wherein said tag forms part of a set of tags in a radio range of the reader and has selected a time slot from a set of available time slots, the method comprising:

a step of the reader sending a query message comprising the set of available time slots;

a step of the reader receiving during the selected time slot a reply message from the tag that selected the time slot, said reply message including a random value selected by the tag, wherein the tag stores authentication coupons and the reply from the tag received by the reader during the time slot contains, as a random value selected by the tag, a value that is a function of one of said coupons;

a step of the reader sending an acknowledgment message to said tag, the acknowledgment message being established as a function of the random value and including a challenge selected by the reader; and a step of the reader receiving an identification message from the tag, the identification message including identification information and an authentication reply calculated from the challenge.

* * * * *